Dec. 19, 1944.     C. H. SMITH     2,365,360
FILTER
Filed May 11, 1942
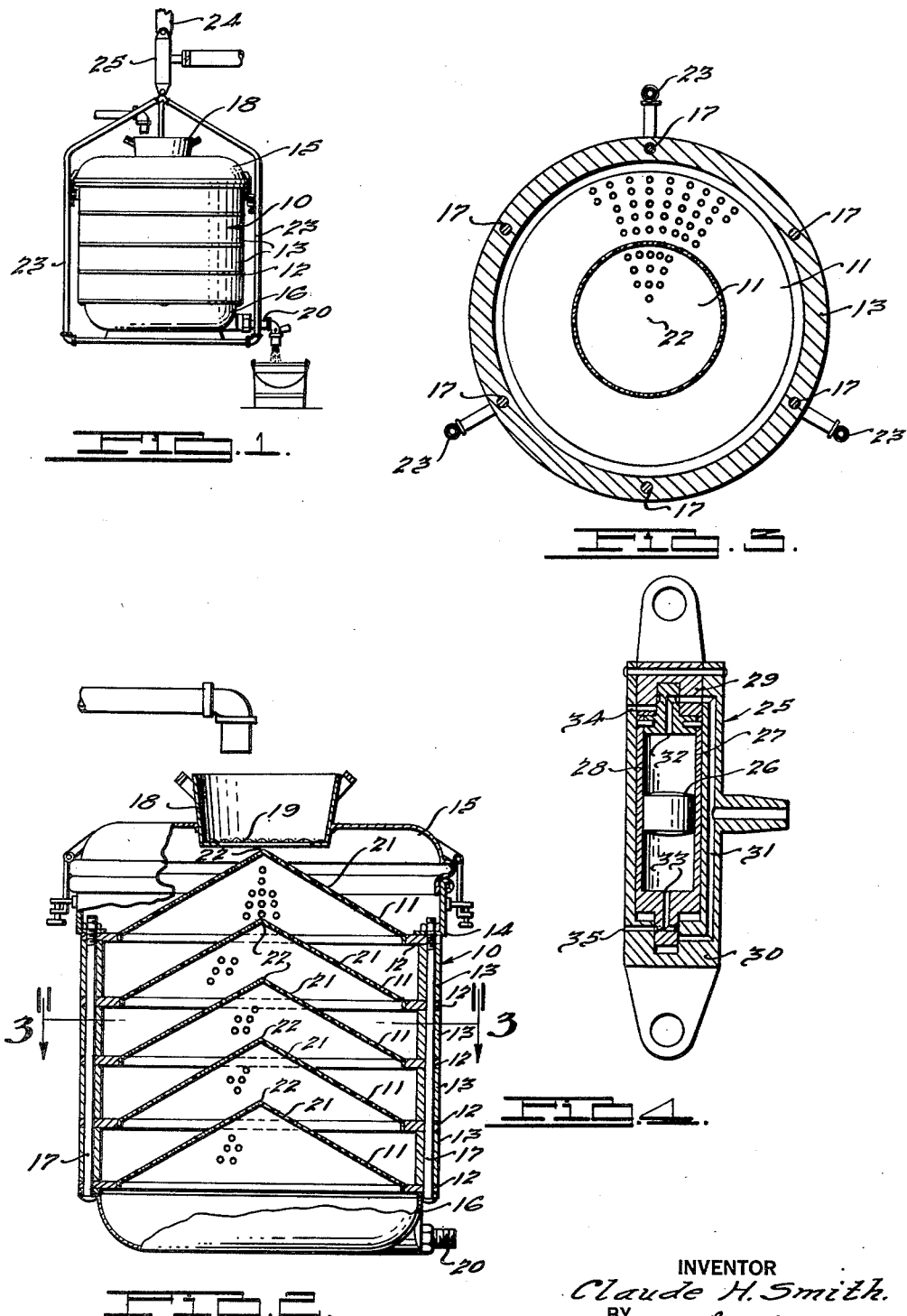
INVENTOR
Claude H. Smith.
BY
Harness, Dicd, Pate & Harris
ATTORNEYS.

Patented Dec. 19, 1944

2,365,360

UNITED STATES PATENT OFFICE 2,365,360

FILTER

Claude H. Smith, Detroit, Mich., assignor to Chrysler Corporation, Highland Park, Mich., a corporation of Delaware Application May 11, 1942, Serial No. 442,412

3 Claims. (Cl. 210—149)

This invention relates to improvements in filters or strainers.

More particularly, the invention relates to devices of this character especially adapted for filtering or straining paint although in its broad aspects the invention is not so limited.

An object of the invention is the provision of a filter or strainer wherein clogging of the filter element or elements is minimized, and more particularly to provide such a device in which those particles of the material to be filtered which will not readily pass through the filtering element are moved during the filtering operation to an unobstructing position with respect to the main body of the filtering surface when deposited on the latter.

Another object of the invention is the provision of a filtering surface so shaped that by vibration thereof particles collected on the latter surface will move to an unobstructing position with respect thereto.

A further object of the invention is the provision of a filter or strainer having means for vibrating the same in a direction generally axially with respect to the flow of the material during the filtering operation whereby relatively large particles collected on the filtering surface are caused to be moved to an unobstructing position relative to the latter surface.

A still further object of the invention is the provision of a filter including a plurality of spaced superimposed filtering surfaces inclined outwardly from a central point, each having a supporting part together with a spacer part between adjacent support parts, these parts cooperating to form the main body of the filter casing and being relatively separable to accommodate cleaning of the filter.

Other objects and advantages of the invention will be more apparent from the following description taken in connection with the accompanying drawing in which:

Fig. 1 is a side elevational view illustrating a filter constructed in accordance with the invention.

Fig. 2 is an enlarged view, mainly in section, illustrating the detail construction of the filter shown in Fig. 1.

Fig. 3 is a horizontal sectional view taken on line 3—3 of Fig. 2.

Fig. 4 is a sectional view of the vibrating device for the filter.

Referring to the drawing, the filter or strainer, generally designated by the numeral 10, includes a plurality of spaced superimposed conically shaped porous filter elements 11, each of which has an axially directed flange attached to the inner pehiphery of a supporting part 12. Adjacent parts 12 are suitably spaced by a spacing part 13 and inasmuch as the filter has an annular contour, these parts are correspondingly shaped and cooperate to form the main body of the filter casing. Mounted on the uppermost part 12 is a band 14 detachably receiving a cover 15 and registering with the lowermost part 12 is a collecting pan 16. A series of circumferentially spaced registering apertures are provided in the parts 12, 13, 15 and 16 respectively receiving an elongated retaining bolt 17 for detachably securing the foregoing parts in assembled relation as shown more particularly in Figs. 2 and 3. The top or cover 15 has an opening in its central portion in which is disposed a hopper 18 having a filtering screen 19 of relatively large porosity disposed across its outlet end. Filtered material is deposited in the pan 16 and passes therefrom through the outlet indicated at 20.

The filter elements 11 are disposed centrally with respect to the filter casing and each has an external filtering surface, indicated by the numeral 21, which is inclined outwardly from a central point indicated at 22, and each filter may therefore be preferably conical. Material passing through the screen 19 is deposited on the successive external filtering surfaces 21 and finally deposited in the pan 16. The porosity of the successive filtering elements may vary between a relatively high degree of porosity for the uppermost element 11 and a relatively low degree porosity for the lowermost of these elements.

In order to agitate the material being filtered and particularly to cause that portion thereof which cannot, because of the size pass through the filter element to pass downwardly and outwardly out of the way of incoming material, the filter unit 10 is suspended by a looped shaped frame 23 from a fixed support as indicated diagrammatically at 24. Disposed between the frame 23 and support 24 is an air hammer indicated by the numeral 25 adapted upon operation thereof in the well-known manner to apply rapid and successive impacts in a direction axially with respect to the filter. This jarring or vibration of the filter causes the relatively large particles which cannot pass through the filtering element to move outwardly on the inclined external surfaces 21 out of the way of incoming material and thus minimizes clogging of the filtering surfaces. Other forms of vibrations means may be employed if desired.

The air hammer 25 includes a piston 26 reciprocable in the bore 27 of a cylindrical valve member 28 to cause the latter to apply rapid and successive impacts to the opposite end walls of the parts 29 and 30. Operating medium is admitted to the bore 27 through a passage 31 formed in the parts 29 and 30 which registers with a passage 32 in the upper end of the member 28 when the parts are positioned as shown in Fig. 4 and which is adapted to register with a passage 33 in the lower end of the member 28 when the latter is moved downwardly in response to the admission of air thereby to the upper side of the piston 26 and thereby admit air to the lower side of the piston. The passages 32 and 33 register with vents 34 and 35 respectively as the member is oppositely moved by the piston 26.

Although but one specific embodiment of the invention is herein shown and described, it will be understood that various changes in the sequence of operations, steps and materials employed may be made without departing from the spirit of the invention.

I claim:

1. In a paint filter, a casing structure having an inlet and an outlet opening for the material to be filtered, a plurality of vertically spaced conical filter elements disposed centrally with respect to said casing and intermediate said inlet and said outlet and arranged with the vertex thereof directed toward said inlet whereby material to be filtered is deposited on the external surface of each element, a support for each of said elements at the perimeter thereof, a spacer disposed between adjacent supports, said spacers and said supports cooperating to form a portion of the outer wall of said casing structure and having openings therein aligned axially with respect to the casing, means in said aligned openings detachably securing said supports and spacers in assembled relation, and means for vibrating said casing and elements axially whereby relatively large particles of paint deposited on said external surfaces are caused to move outwardly with respect to said central point.

2. In a paint filter, a casing structure having an inlet opening adjacent the top portion thereof, a plurality of generally conically-shaped filter elements disposed below said inlet opening in vertically spaced superimposed relationship for successively filtering paint admitted through said inlet opening, the vertex of each of said filter elements being directed toward said inlet opening whereby paint to be filtered is deposited on a surface inclined downwardly and outwardly with respect to the casing structure, said casing structure having an outlet opening below said filter elements, and means for vibrating said casing structure and said filter elements in a direction axially with respect thereto.

3. In a paint filter, a casing structure having vertically spaced inlet and outlet openings respectively adjacent the top and bottom portions of the structure, a plurality of filter elements between said openings spaced vertically one from the other, each of said elements having a central part registering vertically with said inlet opening and opposed wall portions inclined downwardly and outwardly from said central part and forming a partial closure therebetween, the central part of each of said elements being directed toward said inlet opening whereby the paint to be filtered is deposited on the external surface of said wall portions, and means for vibrating said casing structure and said filter elements.

CLAUDE H. SMITH.